United States Patent Office 3,631,128
Patented Dec. 28, 1971

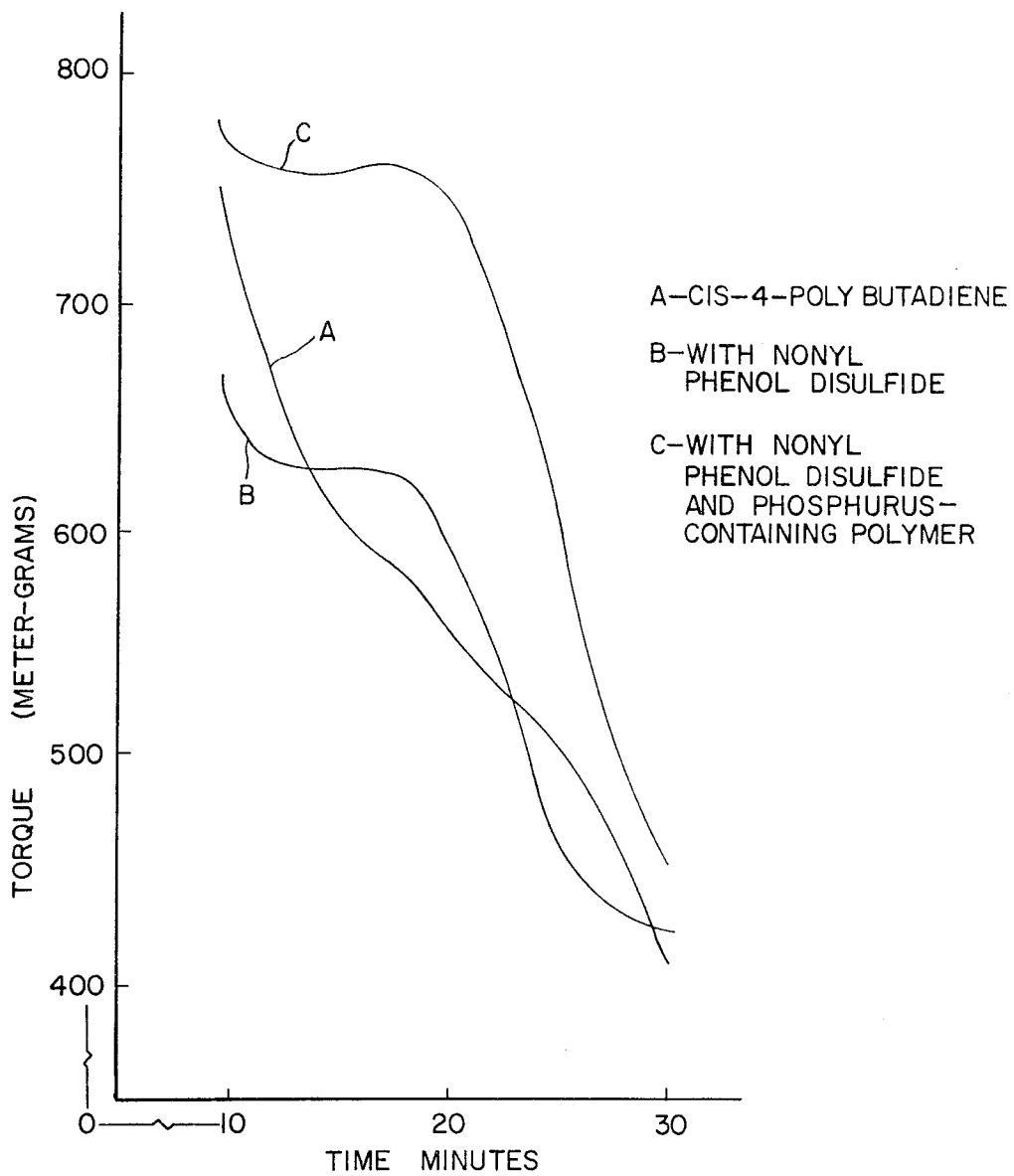

3,631,128
POLYMERS STABILIZED WITH ORGANIC
SULFIDES AND PHOSPHITES
Richard Strauss, Lexington, and James Bottomley, Andover, Mass., assignors to National Polychemicals, Inc., Wilmington, Mass.
Continuation-in-part of applications Ser. No. 443,174, Mar. 26, 1965, now Patent No. 3,435,097, and Ser. No. 462,385, June 8, 1965, now Patent No. 3,367,996; applications Ser. No. 538,022, Mar. 28, 1966, now Patent No. 3,526,679, and Ser. No. 675,299, Oct. 16, 1967, being a division of said application Ser. No. 462,385; and Ser. No. 831,744, June 9, 1969, now Patent No. 3,527,725, being a continuation-in-part of said application Ser. No. 675,299. This application Aug. 27, 1970, Ser. No. 67,487
Int. Cl. C08g 37/18, 51/58
U.S. Cl. 260—845
10 Claims

ABSTRACT OF THE DISCLOSURE

An organic polymer subject to degradation, e.g., a $C_2$–$C_4$ olefin resin or synthetic elastomer, is stabilized by a composition composed of:
(a) an alkylated phenol polysulfide; and
(b) a phosphorus-containing ester polymer prepared by the reaction of a trivalent phosphorus compound, such as phosphorus trichloride and a thermoplastic phenol-formaldehyde novolak resin.

---

This application is a continuation-in-part of our applications, Ser. No. 443,174, filed Mar. 26, 1965, now U.S. Pat. 3,435,097; Ser. No. 462,385, filed June 8, 1965, now U.S. Pat. 3,367,996; our copending application Ser. No. 538,022, filed Mar. 28, 1966, now U.S. Pat. 3,526,679; Ser. No. 675,299, filed Oct. 16, 1967, now abandoned which is a division of application Ser. No. 462,385; and Ser. No. 831,744, filed June 9, 1969, now U.S. Pat. 3,527,725 a continuation-in-part application of 675,299.

Our invention relates to unique and novel mixtures of phosphorus-containing polymers and polysulfide compounds for use in stabilizing organic polymers such as polyolefin resins and natural and synthetic elastomers and to the polymers so stabilized.

BACKGROUND OF THE INVENTION

U.S. Pat. 3,367,996 describes a new and unique class of phosphorus-containing polymers identified as ester polymers and phosphite polymers. These polymers are prepared by the reaction of a phenol, an aldehyde capable of condensing with the phenol and a trivalent phosphorus compound. These compounds are useful as additives in the stabilization of various polymers. U.S. Pat. 3,435,097 describes phosphorus-containing polymers prepared with the use of a phenolic sulfide. The phenolic sulfide phosphite polymers are useful as stabilizers and antioxidants in polymers. However, it has been found that these phenolic sulfide phosphite compounds often have a tendency to develop sulfide odor in use. The inhibition or prevention of such sulfide odor may require the addition of other additives or more sophisticated processing techniques.

It is, therefore, an object of our invention to provide mixtures for use in stabilizing polymers subject to degradation by heat or oxygen which mixtures avoid the development of the sulfide odors associated with the use of phenolic sulfide phosphite polymers and which provide excellent and enhanced stabilizing properties.

Another object of our invention is to provide natural and synthetic elastomers and polyolefin resins stabilized with mixtures of a phosphorus-containing ester polymer and an alkylated bis sulfide.

Other objects and advantages of our invention will be apparent to those persons skilled in the art from the following more detailed description of our invention when taken in conjunction with the accompanying drawing wherein there is shown in graphical form the stabilization of cis 4-polybutadiene elastomer by various additives.

SUMMARY OF THE INVENTION

Briefly, our invention comprises a unique mixture of a phosphorus-containing polymer and an alkylated phenol polysulfide as a stabilizing and/or antioxidant mixture for polymers, in particular polyolefins and polydiene elastomers. We have found that the preparation of a simple mixture or blend of these ingredients avoids the strong sulfide odor associated with polymers prepared by the reaction of an alkylated phenol polysulfide and formaldehyde. In addition, our mixture provides enhanced and surprising stabilizing and antioxidant properties, particularly when incorporated in polymers, such as a gas polybutadiene and a polypropylene resin. These stabilizing mixtures may vary in either component from about 5 to 95 percent by weight, although mixtures of from about 40 to 60 percent by weight typically give optimum results in most common polymers. In general, an increase in the alkylated sulfide compound above about 60 percent may tend to develop a gradually increasing yellow color when the mixture is used in white or light colored polyolefin resins. An increase in the phosphorus-containing polymer above about 60 percent may tend to reduce the antioxidant effectiveness of our mixture. Our mixtures may be even further enhanced in stabilizing properties in polymers by the addition of small amounts of from about 5 to 50 percent by weight of a borate compound such as a hydrocarbon-substituted borate.

The phosphorus-containing polymers employed with our mixture may comprise those ester and phosphite polymers described in U.S. Pat. 3,367,996. The phosphorus-containing polymers prepared by the reaction of a trivalent phosphorus compound, such as phosphorus trihalide like phosphorus trichloride or an organic phosphite through a transesterification reaction with a thermoplastic phenol (preferably an alkylated phenol)-formaldehyde resin novolak, are useful in stabilizing natural and synthetic elastomers due to their high resistance to hydrolysis. Thermoplastic, fusible, soluble phosphorus-containing phosphite polymers prepared with the use of substituted phenols like alkylated $C_4$–$C_{18}$ phenols such as, for example, $C_4$–$C_9$ phenols having para alkyl groups and reacted with less than a stoichiometric amount of formaldehyde, and then reacting the novolak with phosphorus trichloride under substantially nonaqueous conditions are the preferred phosphorus-containing ester polymers for use in our mixtures.

The phenol polysulfides employed in combination with our phosphorus-containing polymers include phenolsulfide, as well as phenolic disulfide polymers. Typical phenolic substituted and unsubstituted polysulfides may be prepared by the general reaction of an alkylated phenol with a sulfur-containing compound such as sulfur monochloride, sulfur dichloride, free sulfur and the like. For example, phenol polysulfides are prepared by the reaction of 1 mol of a phenolic compound with from 1 to 2 mols or more of a sulfur monochloride at temperatures of from about 80 to 350° F. with the removal of hydrochloric acid as the sulfurization reaction proceeds. Typical phenol polysulfide compounds include bis-(nonyl phenol) disulfide, bis-(phenol) disulfide, di-(para nonyl phenol) disulfide, di-(octyl phenol) disulfide, di-(para tertiary butyl phenol) disulfide, poly-(2,6 di-tertiary-4-methyl phenol) disulfide, and the like. A general reaction for the preparation of the polysulfides is as follows:

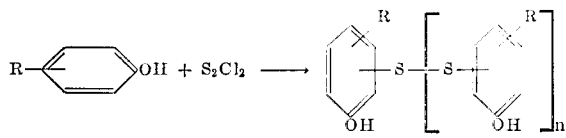

A typical alkylated phenol disulfide would be represented by the formula:

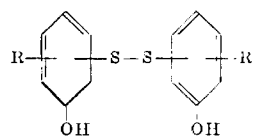

R=one or more hydrocarbon groups such as alkyl groups n=is a number of from to five.

Our mixtures may include the addition of small amounts of a borate such as a hydrocarbon-substituted borate or other borates which have a reduced tendency to hydrolyze. Trishydrocarbon-substituted borates and in particular alkyl, phenyl and alkylated phenyl-substituted borates and mixed borates, such as 2,6-tertiary-butyl-para-cresyl-di-butyl borate may be used. Mixtures having a sulphur-to-phosphite ratio of about two to one to one to two and mixtures having a sulfide-to-borate ratio about three to one are effective as stabilizers.

Our mixtures may be employed in a wide variety of natural and synthetic polymeric materials which are subject to degradation upon exposure to heat or oxygen either during processing or in use. Our mixtures, therefore, may often serve as polyfunctional additives exhibiting both heat stabilizing and antioxidant properties. Typical polymers in which our mixtures may be employed include but are not limited to those natural and synthetic elastomers such as the rubbery diene vulcanizates like polybutadiene, polyisoprene, copolymers of styrene and a diene such as styrene and butadiene and terpolymers thereof, ethylene-propylene copolymers and diene-modified terpolymers, butyl rubber, natural rubber, nitrile rubbers like styrene and acrylonitrile copolymers and butadiene and acrylonitrile copolymers and the like. Our mixtures are particularly preferred for use in those sulfur and zinc oxide curable elastomers having a moderate to high degree of carbon-to-carbon ethylenic unsaturation. Our mixtures may be incorporated in the rubber latex, solvent solutions of the rubber, or directly added or dispersed in the bulk rubber either after, before or during processing of the polymerization reaction but generally prior to vulcanization.

Our mixtures may also be employed in other polymers such as acrylic resins, polyesters, styrene resins, such as polystyrene, styrene-butadiene-acrylonitrile resins, vinyl halide resins such as polyvinyl chloride, copolymers of vinyl acetate and vinyl chloride and the like, as well as in $C_2$–$C_4$ polyolefin resins, such as straight and branch chain, crystalline and noncrystalline, low and high density-type polyethylene, polypropylene, polybutene, ethylene-butene copolymers, ethylene-propylene copolymers and other olefinic resins.

Our mixtures are commonly employed in the polymer in amounts ranging from about 0.001 to 5.0 percent by weight such as in amount of from 0.1 to 3.0 percent by weight in elastomers and 0.05 to 0.5 weight percent in thermoplastic resins. Our mixtures are particularly useful in replacing in whole or in part expensive hindered phenols or antioxidants such as 2,2′-alklene bis 4,6-dialkyl phenols like 2,2′-methylene bis (4,6-ditertiary butyl phenol) presently used as antioxidants. However, our mixtures may be used alone or in conjunction with other additives such as hindered phenols like butyrated hydroxy toluene, thiodipropionic acid esters such as fatty esters like dilaury thiodipropronic acid, stabilizers, plasticizers, carbon black, fillers, curing agents, accelerators, dyes, pigments and the like.

The enhanced, unique and surprising stabilization properties of our mixtures are demonstrated by employing a Brabender Plasti-Corder to evaluate a polymer and then the same polymer with various additives incorporated therein. The Plasti-Corder records the torque in meter-grams of the polymer versus the time in minutes of the polymer sample in the instrument. U.S. Pat. 3,149,093 illustrates the use of the Brabender device in evaluating the degradation of polypropylene resin. The resulting curve of torque versus time provides an indication of the relative stability of the polymer against degradation. The earlier first portion of the curve represents the fluxing stage wherein the polymer used is changed into a homogeneous polymer melt. Thereafter the shape and height of the curve depends upon each polymer's average molecular weight, the molecular weight distribution, apparent viscosity, stability and the conditions of temperature and shear set into the instrument. Typically the curve drops rapidly at the end of the fluxing state to a point of reasonably stable flow. The length of the plateau and the final torque readings of each polymer are indications as to the stability of the polymer. The time length of the plateau indicates how long the polymer retains the condition of stable flow, and is a function of how well the polymer is stabilized against degradation.

EXAMPLE 1

The drawing illustrates the graphical results obtained employing a Brabender to evaluate cis-4-polybutadiene (American Synthetic Rubber Company — Cisdene 100LM). The instrument was operated with a cam-type head, a stock thermocouple temperature of 400° F., a charge of 50 grams, a shear rate of 60 r.p.m., and with each additive indicated employed in an amount of 0.25 part per 100 parts of the polybutadiene as purchased. Curve A represents the results with the cis-4-polybutadiene as purchased. Curve B represents the results with the polybutadiene containing nonyl phenol disulfide. Curve C represents the results with the polybutadiene containing a phosphorus-containing ester polymer and a novel phenol disulfide. The nonyl phenol disulfide was prepared by the reaction of nonyl phenol with a sulfur monochloride in an approximate 1–0.5 mol ratio. The mixture of curve C was prepared in an amount of about 50—50 percent by weight.

The phosphorus-containing phosphite polymer employed in combination with the nonyl phenol disulfide was prepared by the reaction in a substantially nonaqueous alcohol solution of a nonyl phenol formaldehyde novolak with phosphorus trichloride as set forth in Example 4 in U.S. Pat. 3,367,996, and was a pale yellow viscous liquid. The cis-4-polybutadiene stabilized with a commercial alkylated bisphenol sulfide identified as antioxidant AO439 of the Naugatuck Division of United States Rubber Company and the cis-4-polybutadiene stabilized with the phosphorus-containing ester polymer as prepared by Example 4 of U.S. Pat. 3,367,996 gave essentially the same curves in both cases as the unstabilized cis-4-polybutadiene, and therefore, the graphical results are not illustrated in the drawing.

By examination of the graphical results illustrated in the drawing and the test results reported above, the unstabilized cis-4-polybutadiene exhibited a lack of stability as evidenced by the rapid and smooth continuous drop of the torque reading with time without any evidence of a stabilizing plateau. As reported, the conventional stabilizer and antioxidant additive AO439 and the phosphorus-containing ester polymer each fail to exhibit any significant stabilizing plateaus. Curve B representing a moderate stabilizing effect shows a plateau at a torque reading of about 660 meter-grams. Curve C representing the stabilizing mixture of our invention shows a flat plateau at a high torque level of 760–770 meter-grams for the polybutadiene. The short initial drop of the curve, the length of the plateau and the high torque reading illustrate the enhanced effectiveness of employing a mixture of an alkylated phenol disulfide with a phosphorus-containing polymer. No sulfide odor was observed in the polymer with our mixture as shown in curve C. The totally unexpected stabilizing properties of our mixture in combination was better than either component employed alone would indicate. Our stabilizing mixture permits the stabilizing of polymers in Brabender tests at levels of above 650 meter-grams, e.g., 650–750 for periods of test times of greater than 10 minutes, e.g., 10–15 minutes.

EXAMPLE 2

The addition of about 5 percent of a 2,6 tertiary butyl para cresol dialkyl borate to the mixture of Example 1 enhances the stabilizing effectiveness of our mixture by extending the length of the torque-time plateau.

EXAMPLE 3

A light colored ethylene-butene copolymer having a melting index of 22, a density of 0.948 (PE 5130, E. I. Du Pont Company) is enhanced in stabilization by the use of our stabilizing mixture when evaluated by a Brabender device. Comparative Brabender tests at a temperature of 200° C., a shear rate of 125 r.p.m. with additives at 250 r.p.m. between the ethylene-butene copolymer alone and the copolymer containing a commercial hindered phenol known as Ionox 330 as an antioxidant and with our mixture will illustrate our mixture to be clearly superior to the expensive commercial antioxidant at the same additive level in protecting the copolymer from degradation. Our mixture is particularly valuable for use in pigmented or colored polyolefin resins, wherein any tendency of the mixture to slightly yellow or discolor the resin may be unobserved.

EXAMPLE 4

In a heat-aging test a polypropylene resin (Hercules Company Profax 6501) with our mixture as shown in curve C of Example 1 in combination with an equal additive amount of butylated hydroxy toluene will show stabilization of the resin superior to a 50—50 additive mixture of the butylated hydroxy toluene in combination with a dilauryl thiodipropronic acid ester. The latter mixture will impart a yellow color to the polypropylene on standing, while the resin with our mixture will remain light over the same period of time.

Our mixtures are, therefore, useful stabilizers and antioxidant mixtures, and are often superior in performance or less expensive than many commercial antioxidants or stabilizing additives presently employed, while in addition, our mixtures avoid the odor problem of the related reaction products. Our mixtures may also be used as additives in oils, waxes, jet fuels, gasoline, heating oil, lubricants, and other petroleum or chemical solids or liquids wherein a stabilizing additive is desired.

What we claim is:

1. An organic polymer subject to degradation, which polymer is stabilized by the addition of a small amount of from about 0.001 to 5.0 percent by weight of a stabilizing mixture comprising:
   (a) an alkylated phenol polysulfide of the formula:

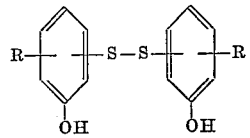

wherein R is an alkyl group;
   (b) a phosphorus-containing polymer prepared by the reaction of a trivalent phosphorus compound and a thermoplastic resin, the phosphorus-containing polymer characterized by having a molecular weight of at least 4500 wherein all the phosphorus valences of the phosphorus atoms of the polymer are connected through oxygen atoms to the phenol rings of more than one fusible phenolic-aldehydic thermoplastic resin molecule and wherein the resin molecule is a condensation product of the reaction between an aldehydic compound selected from the group consisting of aliphatic and alicyclic aldehydes and a phenolic compound wherein the hydroxyl group of the phenolic compound is the only ring-substituted oxygen substituent and wherein the phenolic compounds in the resin molecules are linked mainly through the ortho rather than the para position of the phenol rings;
   the polysulfide and phosphorus-containing polymer each present in an amount ranging from about 5 to 95 percent by weight of the mixture.

2. The composition of claim 1 wherein the polymer is a $C_2$–$C_4$ olefin resin.

3. The polymer of claim 1 wherein the polymer is a diene vulcanizate.

4. The composition of claim 1 wherein the bisphenol polysulfide is a $C_2$–$C_4$ phenol disulfide.

5. The composition of claim 1 wherein the stabilizing mixture includes from about 5 to 50% by weight of a hydrocarbon-substituted borate.

6. The composition of claim 1 wherein the polymer is polybutadiene, the sulfide is a bis-nonyl phenol disulfide and the phosphorus-containing polymer is prepared by the reaction of a phenol-formaldehyde thermoplastic fusible novolak resin with phosphorus trichloride under substantially nonaqueous reaction conditions.

7. The composition of claim 1 wherein the polysulfide and the phosphorus-containing polymer each are present in an amount of from about 40 to 60% by weight of the mixture.

8. The composition of claim 1 wherein the polymer so stabilized is characterized, when evaluated in a Brabender, as having a torque reading of greater than 650 meter-grams and a torque plateau of greater than 10 minutes.

9. The composition of claim 1 wherein the polymer is a polypropylene resin, and the polysulfide is nonyl phenol disulfide.

10. The composition of claim 1 wherein the polymer is an ethylene-butene copolymer and the polysulfide is nonyl phenol disulfide.

References Cited

UNITED STATES PATENTS

| | | | |
|---|---|---|---|
| 2,175,082 | 10/1939 | Hagen et al. | 260—94 |
| 3,112,286 | 11/1963 | Morris et al. | 260—45.7 |
| 3,114,419 | 8/1964 | Guttag | 260—59 |
| 3,297,631 | 1/1967 | Bown et al. | 260—45.95 |
| 3,367,996 | 2/1968 | Strauss et al. | 260—887 |
| 3,376,364 | 4/1968 | Larrison | 260—45.95 |
| 3,435,097 | 3/1969 | Bottomley et al. | 260—45.7 |
| 3,526,679 | 9/1970 | Strauss et al. | 260—848 |
| 3,527,725 | 9/1970 | Strauss et al. | 260—848 |

JOHN C. BLEUTGE, Primary Examiner

U.S. Cl. X.R.

252—404; 260—3, 23.7 M, 29.3, 38, 45.7 PS, 45.95, 838, 842, 844, 846, 847, 848